April 7, 1925.  1,533,018

G. LIEBERMAN

SEPARATOR

Filed Sept. 20, 1922  2 Sheets-Sheet 1

G. Lieberman INVENTOR.

BY Jesse R. Stone

His ATTORNEY.

April 7, 1925.

G. LIEBERMAN 1,533,018

SEPARATOR

Filed Sept. 20, 1922

2 Sheets-Sheet 2

G. Lieberman INVENTOR.

BY Jesse R. Stone

His ATTORNEY.

Patented Apr. 7, 1925.

1,533,018

UNITED STATES PATENT OFFICE.

GEORGE LIEBERMAN, OF GALVESTON, TEXAS.

SEPARATOR.

Application filed September 20, 1922. Serial No. 589,363.

*To all whom it may concern:*

Be it known that I, GEORGE LIEBERMAN, a citizen of the United States, residing at Galveston, Galveston County, Texas, have invented a certain new and useful Improvement in Separators, of which the following is a full, clear, and exact description, such as will enable others skilled in the art to which it appertains to make and use the same.

My invention relates to separators of the centrifugal type and is adapted particularly for use in removing the meat from the shells of crabs and the like crustacea.

The object of my invention is to provide a separator of the type stated that will be light and strong in construction and thus adapted for use in small installations such as in restaurants and in private families.

Other objects are to construct a centrifugal separator for use in separating the meat from the shell of crabs which will consist of a minimum of parts and that will retain with the meat a desirable amount of liquid; and to further construct an efficient means of securing the parts in operative position.

Figure 1:
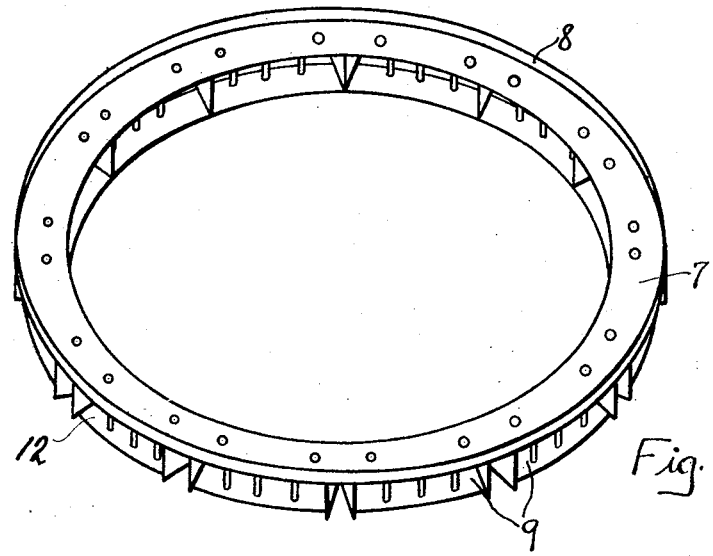
Figure 2:
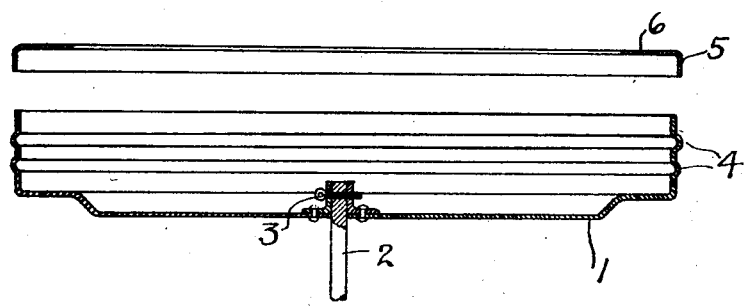
Figure 3:
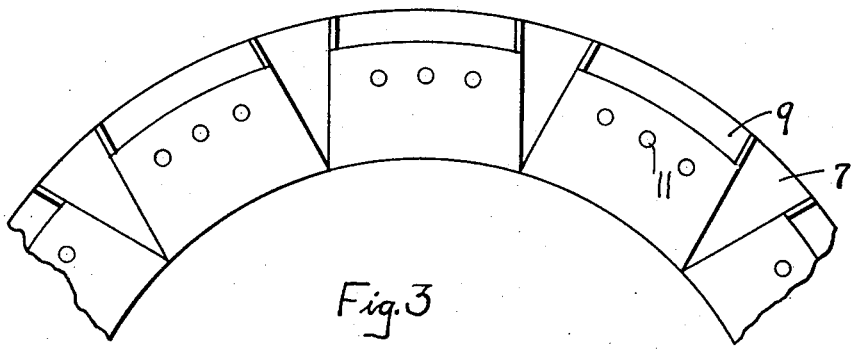
Figure 4:
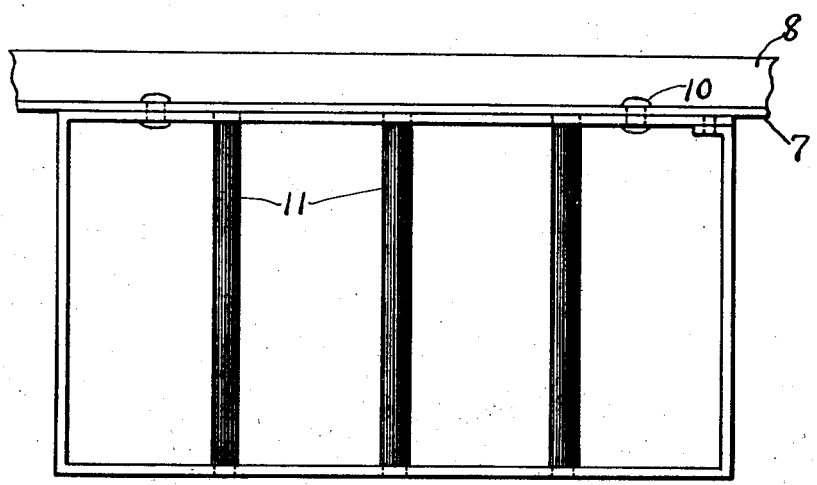

The object and advantages of my device will best be understood from a more particular description thereof. In the drawing herewith, Fig. 1 is a perspective view of the shell rack used with my device. Fig. 2 is a central vertical section of my rotating container, Fig. 3 is a broken bottom plan of the rack shown in Fig. 1 and Fig. 4 is a detail of one of the shell-holding compartments.

In the removing of the meat from the shells of crabs, crawfish and other similar crustacea, I have found that the operation may be most quickly performed by placing the shells within a centrifugal device and by the operation thereof remove, through the force of rotation the edible portion of the crab from the shell. In Fig. 2 I have shown the container 1, which is the preferred embodiment of my rotating device. It is mounted centrally upon a shaft 2 and removably secured thereto by means of a cotter pin 3, or other similar means. Rotation of the shaft 2 by means of a connection with some source of power not shown, will rotate the container 1 at the desired rate of speed. The container is practically cylindrical in shape, but has intermediate the ends thereof, peripheral beads, 4. There may be one or more of these beads, and as will be seen from the description which follows, the beads act not only to strengthen the container itself, but act to receive the liquid from the crab meat during the operation of the device. Immediately above the container 1 I have shown a cover or reinforcing member 5. This is slightly larger in diameter than is the container, and is adapted to fit closely over the upper end of the container. It has an inwardly directed flange 6 which partially closes the container adjacent the edge thereof, leaving the central portion open.

To receive the crabs to be operated upon, I have formed a rack comprising an upper annular plate 7, having an outside diameter equal to the internal diameter of the container 1, so that it may fit closely therein. This plate 7 is adapted to set horizontally within the container and has a marginal upwardly directed flange 8 to fit against the wall of the container.

Secured on the lower side of the plate 7 are a series of compartments, 9. These compartments, as shown in Fig. 4, may be made of a strip of sheet metal, preferably aluminum, which is bent into a rectangular shape, and thus formed into an open-ended compartment having top, side and bottom walls, and having the inner and outer ends open. This compartment is secured to the plate 7 on the under side of said plate by means of rivets 10 or other similar means. About midway between the inner and outer ends of each compartment I form a foraminated wall to hold the shells of the crustacea and to allow the meat within the shell to pass through the same. This wall I have shown as made up of a plurality of vertical posts or rods 11 secured at the upper and lower ends to the walls of the compartment. The compartment is thus divided into an inner and outer chamber. The outer chamber 12 has the bottom wall thereof cut away or removed to a point spaced somewhat from the outer end so as to allow the meat of the crab to remain on the floor of the container when the rack is removed.

As will be noted from Fig. 3 the compartments are arranged radially so that they touch on their inner sides and are spaced somewhat from each other on their outer sides, each compartment having its side walls approximately parallel.

In the operation of this device, the crabs or other crustacea are cooked in the usual way, and cleaned of everything except the edible portion and the shells containing the meat are then placed in the inner chamber of the compartment. The rack is then placed within the container 1, and when thus in position the reinforcing cover member 5 is placed in position, and the container is then rotated at the proper speed for a period sufficient to remove from the shells the meat. During this operation the liquid within the shells is thrown outwardly against the wall of the container. Some of this liquid remains within the beads 4. The remainder is thrown outwardly around the upper edge of the container and beneath the cover portion and received in some outer receptacle or housing. When the operation is complete the rotation is stopped and the cover and rack removed from the container. The shells remain within the inner chamber and the meat will be found against the side walls of the container and on the lower wall adjacent the side wall where the bottom floor of the compartment is cut away. Thus, when the rack is removed the shell is also taken, and the same may be dumped with the refuse. The edible portion of the meat, together with a suitable quantity of the juice from the crabs will remain within the container and may be removed for use.

In making this type of centrifugal separator for household use, it is necessary to build the same light and small so that it may be operated by hand, or at least by the use of a very small motor. I thus contemplate making not only the container, but the rack itself, of aluminum. When it is made of such material it is necessary that it be strong and that there be a very even pressure within the container against the walls thereof. For this reason it is necessary that the plate 7 be made of one integral member so that there will be no tendency of any movable part thereof to be thrown outwardly against the walls unevenly. By making the plate 7 of one section and securing the compartments firmly to this plate, I form a rack which fits evenly within the container, and when thus fitted in place the ring or cover, 5 may be placed over the upper end of the container, thus reinforcing that portion and assisting to retain the rack in place. This forms a light and compact device which is easily operated even by hand and may be adapted for use in small installations where other power is not available.

The advantages of this type of construction will be apparent to one skilled in the art, and while I have shown a preferred embodiment of my invention, I wish it understood that various modifications of this device may be made without departing from the spirit of the invention.

Having thus described my invention, what I claim as new and desire to protect by Letters Patent is:

1. A device of the character described comprising a rotatable container, a single integral rack therein having a series of radially arranged open-ended compartments, rods separating each compartment into two chambers, the bottom walls of each said compartment extending from the inner side thereof to a point spaced from the outer end of the compartment, for the purpose described.

2. A device of the character described comprising a rotatable container, a single integral annular rack fitting closely therein, a series of compartments on said rack open at each end and having a partition with openings therein dividing each compartment into inner and outer chambers having bottom and side walls, the bottom wall of said outer chamber being cut away short of the outer side in the manner and for the purpose described.

3. A device of the character described comprising a rotatable container, an annular rack fitting therein, separating compartments radially arranged on said rack and an annular bead in the wall of said container to retain liquid in the manner described.

4. In a device of the character described, a rotatable container, an annular separating rack in said container, means to secure said rack in position and means on said container to retain liquid during the operation thereof.

5. In a device of the character described, an approximately cylindrical rotatable container, an annular separating rack fitting closely in said container, and a removable locking and reinforcing ring fitting slidable over the upper end of said container leaving the central portion thereof open.

6. In a device of the character described a rotatable container having fluid containing and reinforcing means formed thereon, a reinforcing ring adapted to fit over the upper end thereof, and an annular integral separating rack formed to fit within said container.

7. In a device of the character described, the combination of a rotatable container, a rack adapted to fit closely therein, compartments on said rack, having inner and outer chambers, the outer chamber having the outer portion of its lower wall removed and means on said container to retain a portion of liquid in the manner described.

In testimony whereof, I hereunto affix my signature, this the 18th day of September, A. D. 1922.

GEORGE LIEBERMAN.